United States Patent [19]

Abdukarimov et al.

[11] Patent Number: 4,721,838
[45] Date of Patent: Jan. 26, 1988

[54] TOOL FOR ELECTRICAL DISCHARGE PIERCING OF INTRICATELY-SHAPED HOLES AND METHOD OF USING SAME

[76] Inventors: Erkin T. Abdukarimov, Ts-I, 52, kv. 6; Pavel M. Vetchinkin, ulitsa B. Khmelnitskogo, 10, kv. 1; Mukhtar S. Saidov, ulitsa Timiryazeva 2a, kv. 9, all of Tashkent, U.S.S.R.

[21] Appl. No.: 665,635

[22] Filed: Oct. 29, 1984

[51] Int. Cl.⁴ .................................................. B23H 1/04
[52] U.S. Cl. .................................. 219/69 E; 219/69 M
[58] Field of Search ............................. 219/69 E, 69 V; 204/280

[56] References Cited

U.S. PATENT DOCUMENTS

| | | | |
|---|---|---|---|
| 2,758,238 | 8/1956 | Todd | 219/69 V |
| 2,902,584 | 9/1959 | Ullmann | 219/69 E |
| 3,306,838 | 2/1967 | Johnson | 219/69 E |
| 3,783,225 | 1/1974 | Filsinger | 219/69 V |
| 3,795,604 | 3/1974 | McKinney et al. | 219/69 E |
| 4,096,371 | 6/1978 | Lozon | 219/69 E |
| 4,104,503 | 8/1978 | Di Piazza et al. | 219/69 E |
| 4,152,570 | 5/1979 | Inoue et al. | 219/69 V |
| 4,349,716 | 9/1982 | Di Piazza | 219/69 E |
| 4,374,313 | 2/1983 | Mateja et al. | 219/69 E |

FOREIGN PATENT DOCUMENTS

| | | | |
|---|---|---|---|
| 2504835 | 11/1982 | France | 219/69 E |
| 57-89529 | 6/1982 | Japan | 219/69 E |
| 854033 | 11/1960 | United Kingdom | 219/69 E |
| 1084188 | 9/1967 | United Kingdom | 219/69 E |
| 1119399 | 7/1968 | United Kingdom | 219/69 E |
| 173117 | 7/1965 | U.S.S.R. | 219/69 E |
| 846211 | 7/1981 | U.S.S.R. | 219/69 E |
| 717846 | 9/1981 | U.S.S.R. | 204/129.25 |

Primary Examiner—A. D. Pellinen
Assistant Examiner—Geoffrey S. Evans
Attorney, Agent, or Firm—Lilling & Greenspan

[57] ABSTRACT

An electrode tool for electroerosive drilling of holes in workpieces includes a central electrode fabricated from an electroconductive material and disposed in a shell with a gap. The central electrode projects from a working end of the shell toward the workpiece, the projecting portion of the central electrode being bent at an angle α, the end of the bent portion being spaced from the side surface of the shell. A method for electroerosive drilling of holes having variable transverse and longitudinal sections in terms of hole depth, this method also being capable of producing holes with reverse angles and obtaining round shaped configurations of holes.

7 Claims, 14 Drawing Figures

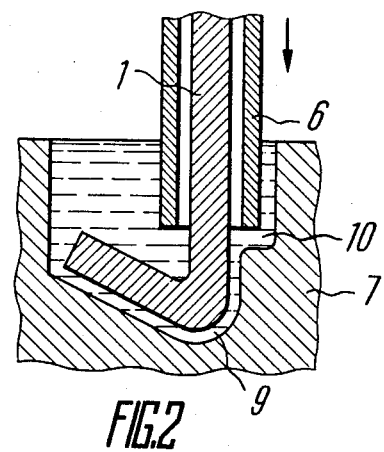
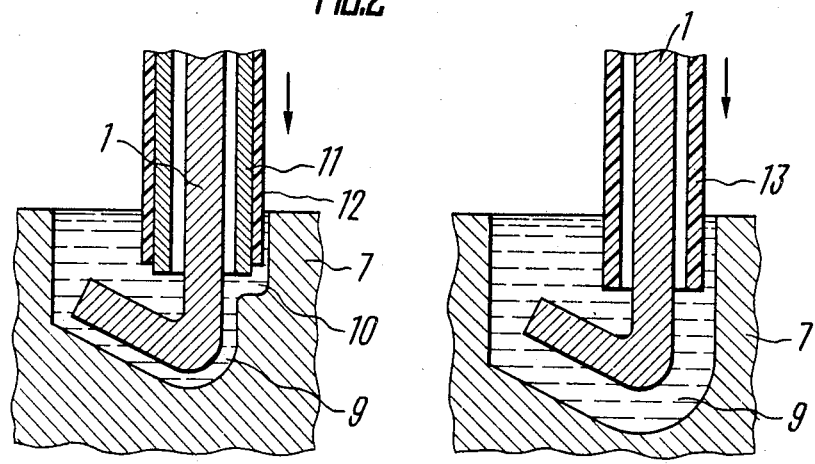
FIG.2
FIG.3
FIG.4

TOOL FOR ELECTRICAL DISCHARGE PIERCING OF INTRICATELY-SHAPED HOLES AND METHOD OF USING SAME

FIELD OF THE INVENTION

This invention relates to electroerosive machining, and more particularly to tools for methods of electroerosive drilling of holes in workpieces by electrode tools.

The invention can find application predominantly for machining electroconductive materials by electrodischarge erosion, particularly materials that are hard to machine otherwise (viz., superhard or viscous materials) for obtaining substantially tubular parts of complex cross-sectional configuration. Parts machined by means of such an electrode by applying the proposed method are employed mostly in motor-vehicle production, compressor making, hydraulic and pneumatic engineering.

BACKGROUND OF THE INVENTION

A major problem associated with electroerosive machining is evacuation of the products of erosion. Efficient evacuation of the products of erosion facilitates producing holes with required depth and diameter. It also makes it possible to obtain shaped profiles of parts machined to a required precision at one set-up, that is without any pre-treatment or after-finishing. The rate and accuracy of machining further depend on the manner in which the energy released from the working end of the electrode tool is concentrated, and the method of machining selected.

There is known a method and device for evacuating the products of erosion and gas bubbles from an interelectrode gap (cf., Patent of West Germany No. 1,139,359; IPC B 23 P, published 1958) in which an electrode for making holes is fashioned as a cylinder having an inclined passage in its body for evacuating the products of erosion. The entire device, including the workpiece being machined, the electrode and the dielectric fluid, is accommodated in a sealed bath with an overpressure acting to force the fluid to move in the workpiece-electrode gap, entraining the products of erosion, and discharging them through the passage in the electrode.

However, this construction of the electrode fails to enable the machining of deep holes of small diameter. The reason for the failure is in that the considerable surface area of the electrode, as compared with the inlet area of the passage, prevents efficient evacuation of particles from this gap. In addition, the depth of holes thus drilled is never greater than the projection of the passage in the electrode onto the vertical centerline thereof.

These disadvantages are partially obviated by a French Pat. No. 1,178,722 IPC B 23 P, published 1957 and entitled "EDM Device and Method" in which, for removing the products of erosion, the electrode has the form of a hollow tube in which a dielectric fluid is supplied under pressure to escape with the products of erosion to a bath through an electrode-workpiece gap. An oscillatory motion is imparted to the workpiece with an amplitude causing cavitation in the dielectric fluid, this motion acting to discharge the products of erosion. The workpiece is simultaneously rotated.

However, this construction of the electrode fails to allow the drilling of holes at high magnitudes of discharge currents accompanied by the formation of large-size particle fraction of the products of erosion.

An electric pulse discharge causes a vapour fraction to appear and pitting to take place due to thermoresilient stresses to which the electrode is subjected. The particles of coarse fraction become larger in size as the power of the discharge grows and the duration of the pulse shortens. Therefore, an increase in the discharge current results in the coarse fraction failing to escape from the discharge gap to short circuit it and lead to the formation, on the end of the electrode, of growths of the products of erosion. Therefore, weak currents with rather sloping edges are necessary for operating such and electrode, which affects the efficiency of the electroerosive process, the reliability of the apparatus and the quality of machining.

In addition, the above methods and apparatus fail to produce deep holes of smaller diameter since the hole of the hollow electrode must be large enough so dielectric fluid can pass. The above method and apparatus also fail to produce holes of substantial diameter since in the course of electroerosive machining the material of the workpiece in proximity to the walls of the electrode at a distance of 1 to 1.5 mm is removed therefrom, whereas a projection tends to be formed in the center of the hole being drilled.

There is also known a device for electroerosive machining (cf., U.S. Pat. No. 2,718,581, Cl. 219-15, published 1955) in which inside a substantially hollow electrode there is symmetrically disposed another hollow electrode at one level with the first electrode. The second electrode acts to partially remove the core, while leaving in the center a non-removed portion.

At a certain depth of the hole being drilled the products of erosion fail to escape from the interior of the inner cylindrical electrode, whereby a further drilling becomes impossible. The products of erosion are evacuated with the dielectric fluid through the gap between the walls of the outer and inner electrodes.

However, the aforedescribed device suffers from the disadvantage that it enables the drilling of holes of only small diameter and depth. The device also suffers from insufficient reliability.

A device and method which bear the closest resemblance to those to be disclosed in the present specification are taught in French Pat. No. 2,097,709, IPC B 23 P 1/00, published 1971 and entitled "Electrode for Electroerosive Machining, Method of Using Thereof, and Device for Carrying out the Method". The device has an electrode tool provided with a central electrode enclosed by a shell, this central electrode being fashioned as a spirally wound rod having a rectangular or triangular cross-section and arranged at the level with the shell.

The central electrode is spirally wound so as to form, between the electrode and the inner surface of the shell, substantially spiral or helicoidal passages not extending beyond the longitudinal centerline of the electrode tool.

However, inherent in the above construction is a disadvantage in that the electrode tool ensures hole drilling to a low depth at a rather low efficiency of the electroerosive machining process. This disadvantage is accounted for by the fact that in the area of currents of considerable magnitude the large-size particle fraction fails to separate from the central electrode and is therefore welded thereto due to the small interelectrode gap. On the other hand, it is impossible to concentrate the liberated energy within a small portion of the electrode, which affects the efficiency of the electroerosive machining process, since the amount of the products of erosion increases with the growth in the density of the energy released. In addition, the spirally wound central electrode accommodated inside the shell offers resistance to the ascending flow of liquid carrying the products of erosion. This in turn results in deposition of the products of erosion on the faces of the spirally wound central electrode, build-up of these products thereon and clogging of the passage in the electrode tool, thereby making the device less reliable. In addition, the above construction of the electrode tool makes it impossible to drill holes of small dimensions due to the fact that the spiral shape of the central electrode has considerable cross-sectional dimensions.

There is further known an electroerosive machining method (cf., U.S. Pat. No. 2,902,584 Cl. 219-69) in which an electrode tool is advanced toward the workpiece being machined while the working end of the electrode tool is shifted for at least one combined motion in a direction different from the initial advance feed of the electrode tool. The working end of the electrode tool is displaced linearly toward the workpiece, and thereafter, for obtaining shaped holes, it is rotated about a center somewhat offset relative to the center of the working end of the electrode tool at a predetermined angle to displace in succession the working end of the electrode tool. This is followed by again rotating the working end of the electrode tool about the same center at a second predetermined angle. All these stages are repeated a required number of times.

The method, however, fails to ensure the production of deep holes of small diameter. It is also impossible to obtain shaped holes having acute or reverse angles, since the working end of the electrode tool is returned to the initial position after the first stage of the process has been completed without machining the inner surface of the workpiece.

The configuration of the hole being machined depends on the shape of the electrode tool; the electrode tool should preferably have a cross-section substantially identical to the configuration of the hole throughout its length. The electrode must move freely in the passage.

SUMMARY OF THE INVENTION

It is therefore an object of the present invention to provide an electrode tool for electroerosive drilling of holes in workpieces, and a method of electroerosive drilling of holes, particularly holes of various depths and diameters, as well as through and blind holes.

Another object is to provide a method and electrode tool for electroerosive drilling of holes having shaped transverse and longitudinal sections at one set-up without any pre-treatment or after-finishing operations.

Also an object of the invention is to increase the efficiency and improve the reliability of the electrode tool while maintaining a high quality of hole drilling.

These objects and attending advantages are attained by an electrode tool for electroerosive drilling of holes in workpieces comprising a central electrode fabricated from an electroconductive material and arranged coaxially in a shell and, according to the invention, the central electrode is positioned relative to the shell with a gap to project from a working end of the shell toward the workpiece, the projecting portion of the central electrode being bent at an angle $\alpha$, the end of the bent portion being spaced from the side surface of the shell.

Preferably, the shell is fabricated from metal.

Desirably, an electro-insulating coating is applied to the metal shell at a certain distance from the working end of the shell.

Alternatively, the shell is fabricated from a dielectric material.

The provision of the central electrode projecting from the working end of the shell toward the workpiece and the arrangement of the central electrode with a gap relative to the shell assure drilling of deep holes.

The provision of the metal shell without application of a voltage thereto facilitates still further the electroerosive process due to the fact that the side surface of the central electrode is shielded to prevent dissipation of energy and to evacuate the products of erosion through the gap between the central electrode and the shell, as well as through the gap between the shell and the workpiece. In addition, the rigidly attached metal shell ensures a greater accuracy of hole drilling without deviations from the center.

The provision of a metal shell and the application thereto of a voltage of the same potential as that applied to the central electrode ensures a greater efficiency of hole drilling due to the fact that the shell also becomes envolved in the electroerosive machining process.

The provision of the metal shell coated with an electrically insulating material and the application of a voltage to such a shell gives an even greater efficiency and accuracy of hole drilling due to the fact that the energy is not dissipated from the side surface of the shell, while the energy of any single discharge is released exclusively in the workpiece-electrode gap, or in the workpiece-shell gap.

The provision of the shell fabricated from a dielectric material enables to the production of deep slotted holes due to the use of such a thin-walled shell. It also makes it possible to increase the efficiency, speed, accuracy and surface finish of electroerosive machining, whereby incidental short-circuiting between the side surface of the central electrode and the walls of the hole being drilled is completely eliminated.

For obtaining hole configurations with reverse or acute angles it is advisable that in a modified form of the method of electroerosive drilling of holes in workpieces by the electrode tool in which the electrode tool or the workpiece during their advance travel be deviated to at least one combined motion in a direction substantially perpendicular to their advance travel as the electrode tool penetrates further into the workpiece being machined, the electrode tool or the workpiece at a certain depth being moved in a direction opposite to the initial advance feed to thereby obtain a sectional configuration with reverse or acute angles.

Preferably, for making substantially round holes either the central electrode of the electrode tool or the workpiece is rotated.

Alternatively, for increasing the electroerosive machining efficiency the electrode tool and the workpiece are both rotated independently in the opposite directions.

Application of the proposed method enables the making of holes with any variable cross-sectional configuration in terms of their depth in various electrconductive materials.

The use of the method also makes it possible to control the curvature and size of such variable cross-sectional configurations of the holes made.

BRIEF DESCRIPTION OF THE DRAWINGS

The invention will now be described in greater detail with reference to various preferred embodiments thereof taken in conjunction with the accompanying drawings, in which:

FIG. 2 shows a construction of the electrode tool for electroerosive drilling of holes when a voltage is applied to a shell fabricated from metal;

FIG. 3 is a construction of the electrode tool for electroerosive drilling of holes in workpieces in which an electro-insulating coating is applied to a metal shell;

FIG. 4 shows an alternative modification of the electrode tool according to the invention in which the shell is made from a dielectric material;

BEST MODE OF CARRYING OUT THE INVENTION

Figure 1:
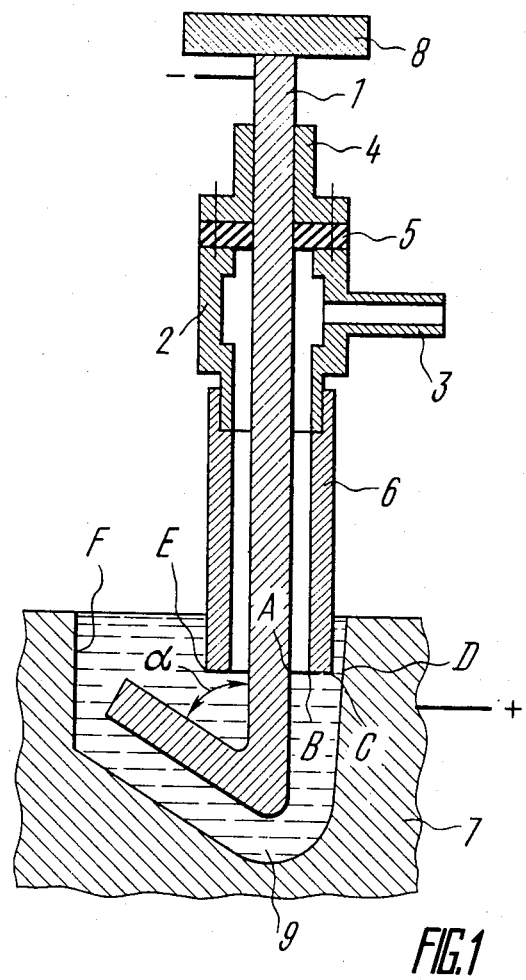
FIG. 1 illustrates longitudinal section in an electrode tool for electroerosive drilling of holes in workpieces according to the invention.

An electrode tool for electroerosive drilling of holes in workpieces according to the invention comprises a central electrode 1 (FIG. 1) fabricated from an electroconductive material on which there is mounted a substantially hollow adapter 2 having a nipple 3 and secured to the central electrode 1 by means of a sleeve 4 and a seal 5.

On the side opposite to the arrangement of the sleeve 4 the adapter 2 has fitted thereon a shell 6 so as to embrace the central electrode 1 with a gap indicated by AB, the central electrode projecting toward the workpiece 7 being machined. The projecting portion of the central electrode 1 is bent at an angle $\alpha$, the end of the bent portion being spaced from the side surface of the shell 6. The angle $\alpha$ can be varied within a range of $0° < \alpha < 180°$.

The non-working end of the central electrode 1 is connected to a means 8 ensuring attachment, feed and adjustment of the electrode tool.

The electrode tool operates in the following manner.

The working end of the central electrode 1 is placed in front of the workpiece 7 and is connected to a negative terminal of a pulsed source of electric current (not shown). After the working end of the central electrode 1 of the electrode tool is brought closer to the workpiece 7, particularly close enough for a spark to be initiated therebetween, electroerosion of the material of the workpiece 7 taking place in the area of the projecting portion of the central electrode 1. As a result, a crater or hole is formed in the workpiece 7 through which and in conjunction with the gap AB between the central electrode 1 and the shell 6, as well as gaps CD and EF between the shell 6 and the workpiece 7, the products of erosion in a suspended state can be easily evacuated. A combination of such features as the arrangement of the central electrode 1 with the gap AB relative to the shell 6 and the projection of the central electrode 1 from the working end of the shell 28 toward the workpiece 7 being machined, as well as the bent shape of the central electrode at the angle $\alpha$ provide for efficient evacuation of the products of erosion from the machining zone, thereby ensuring a higher efficiency of the electroerosive machining process.

The shell 6 can be fabricated from metal. The electric current may not be applied to this shell 6. In this case the shell 6 serves for shielding the side surface of the central electrode 1 with the aim of preventing dissipation of energy and for a more efficient discharge of the products of erosion through the gaps AB, CD and EF. In addition, the shell 6 rigidly affixed on the adapter 2 assures a more accurate hole drilling without deviations from the center.

In order to make the process of electroerosive drilling still more efficient, the shell 6 (FIG. 2) is connected to the negative terminal of the pulsed current source, i.e., the same potential is applied thereto as to the central electrode 1. This involves the shell 6 in the process of electroerosive machining. Initially, erosion of the material of the workpiece 7 takes place in the area of the central electrode to result in the formation in the workpiece 7 of a crater 9. Thereafter, the electrode tool is advanced toward the workpiece 7, whereby a progressive movement of the central electrode 1 to the thus formed crater 9 results in a deduction of the distance between the workpiece 7 and the shell 6 to cause a spark between the workpiece 7 and the shell 6. In this manner the working end of the shell 6 becomes engaged in the process of electroerosive machining to produce a crater 10.

By advancing the electrode tool at a predetermined rate toward the crater or hole being drilled an electroerosive machining process is set to maintain the following sequence of actions for drilling the hole by the parts of the electrode tool: first by the central electrode 1, and thereafter by the shell 6. In other words, a successive automatic self-adjustment for deep-hole drilling is effected.

In order to increase the efficiency and accuracy of electroerosive machining of deep holes, an electroinsulating coating 12 is applied to a shell 11 (FIG. 3) at a certain distance from the working end thereof for the case when an electric current is fed to this shell 11. The need for applying such a coating is accounted for by that, during the progressive movement of the electrode tool to a greater depth, side surfaces of the shell 11 are brought into action to result in a loss of energy, and consequently in a failure to sustain the shape of charge pulses in the course of drilling holes throughout their depth, or to release a higher density energy on the end face of the shell 11.

A distinctive feature of operation of the shell 11 having an insulating coating 12 resides in that the energy of any single discharge pulse is released only in one gap, particularly either in the workpiece 7—central electrode system, or in the workpiece 7—shell 11 system. This increases the density of energy liberated and results in greater efficiency of the electroerosive machining process.

For producing narrow slotted holes it is necessary that the walls of the shells 6 and 11 (FIGS. 1, 2 and 3) be thinner, which is practically impossible when they are fabricated from metal. For this purpose these shells are preferably made from a dielectric material.

The use of a dielectric shell 13 (FIG. 4) makes it possible to completely eliminate a short circuit between the side surface of the central electrode 1 and the walls of the hole being made, which assures trouble-free operation of the electrode tool and enables the drilling of the hole by the projecting bent portion of the central electrode 1. In turn, this allows to sustain the shape of the discharge pulse throughout the length of the hole, that is to effect a controllable or programmable electroerosive hole drilling in the workpiece 7. All the aforedescribed promotes the efficiency, speed, and accuracy of hole drilling. It also makes it possible to obtain deep narrow slotted holes.

Holes are drilled by the above electrode tool in a manner similar to what has been described with reference to the electrode tool having a metal shell 6 (FIG. 1) when an electric current is not applied thereto.

In the course of carrying out the methods of electroerosive machining of holes by means of electrode tools of the above construction and for making substantially round holes rotation is imparted to the central electrode 1 apart from advancing it progressively toward the workpiece.

All the aforedescribed methods can be used for electroerosive machining of holes of substantially cylindrical shape and various depth, as well as for making blind or through holes.

Let us consider modifications for producing holes having variable transverse and longitudinal sections in terms of hole depth.

The shape of transverse and longitudinal sections of a hole depends substantially on the angle $\alpha$ of bending of the projecting portion of the central electrode 1. The angle may be varied within a range of $0° < \alpha < 180°$.

By presetting the required angle $\alpha$ of bending of the projecting portion of the central electrode 1 it is possible to control the size and configuration of the transverse and longitudinal sections of the hole being machined.

The method of electroerosive machining of holes with variable configurations of transverse sections in terms of hole depth is carried out by means of the projecting portion of the central electrode 1 bent the angle $\alpha$ in the following manner.

Figure 5:
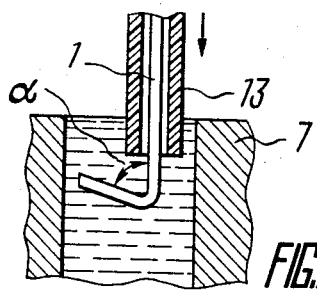
FIG. 5 illustrates an alternative construction of the electrode tool according to the invention for drilling holes of slotted configuration with invariable sections in terms of hole depth.
Figure 6:
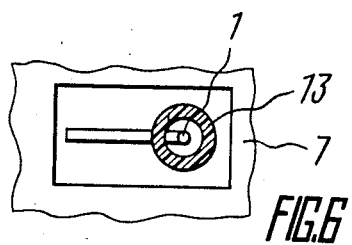
FIG. 6 is a top plan view of the electrode tool shown in FIG. 5.

As the electrode tool moves axially toward the hole being made, it penetrates progressively inside this hole. In such an instance, the hole takes the form of a slot having an invariable cross-section in terms of hole depth (FIGS. 5 and 6). For drilling a hole having a variable cross-section in terms of hole depth the electrode tool or the workpiece 7 are moved, apart from being axially advanced, for at least one combined motion in a direction substantially perpendicular to the direction of such advancement. Therewith, the rate of such perpendicular travel of the electrode tool or the workpiece 7 may be either greater, or less, or the same as the rate of axial feed of the electrode tool. Depending on the ratio between the rates of movement of the electrode tool or the workpiece 7 in the two mutually perpendicular directions, a hole with varying shape in terms of hole depth is formed having a required configuration and predetermined transverse and longitudinal dimensions.

Figure 7:
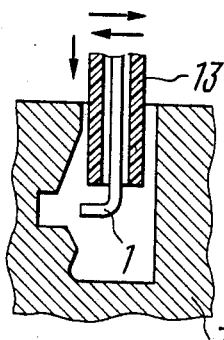
FIGS. 7, 8 and 9 show longitudinal sections of the profiles of substantially slotted holes obtained at different angles of bend of the projecting portion of the central electrode, the profiles varying in terms of hole depth.
Figure 8:
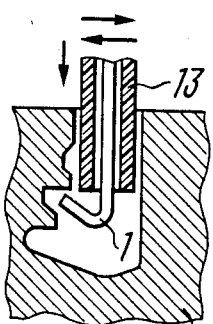
Figure 9:
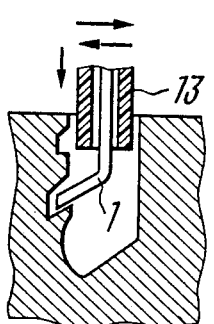

Configuration of holes in this case depends also on the preselected angle $\alpha$. For example, when this angle $\alpha$ is 90°, the hole configuration will be as one shown in FIG. 7; for the angle $\alpha < 90°$, it will be like one illustrated in FIG. 8, whereas for the angle $\alpha > 90°$ the hole configuration will be as shown in FIG. 9.

Figure 10:
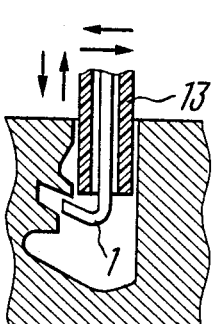
FIG. 10 shows a profile of a substantially slotted hole with reverse or acute angles and variable configuration in terms of hole depth.

For abtaining a hole with an acute or reverse angle use is made of the central electrode 1 the end of which is bent at an angle $\alpha < 90°$ (FIG. 10).

Subsequent to penetration of the electrode tool to a certain depth in the workpiece 7, this electrode tool or the workpiece 7 are made to move in a direction perpendicular to the direction of feed accompanied by simultaneous movement of the electrode tool or the workpiece in a direction reversed relative to the feed path. Depending on the required configuration of the hole being made and on the transverse and longitudinal dimensions thereof, a required ratio between the rate of feed of the electrode tool or the workpiece 7 in the mutually perpendicular directions is selected.

Figure 11:
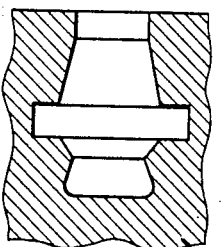
FIGS. 11, 12 and 13 show substantially round shaped profiles of holes obtained by the bent projecting portion of the central electrode.
Figure 12:
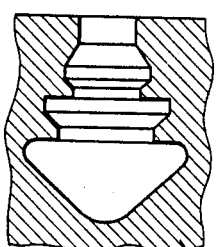
Figure 13:
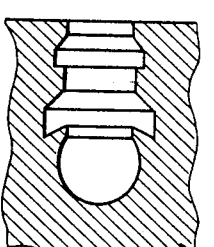
Figure 14:
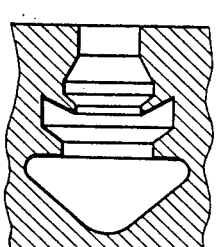
FIG. 14 shows a round shaped profile of holes with reverse or acute engles.

For producing substantially round shaped profiles of the holes being made varying in their shape in terms of hole depth and featuring an acute or reverse angle, apart from the abovedescribed operations of the method, the electrode tool or the workpiece 7 are rotated. The sections of holes thus produced are represented in FIGS. 11, 12 and 13; FIG. 14 illustrating a hole with an acute angle or reverse profile.

The rotation of the central electrode 1 of the electrode tool relative to the workpiece 7 is executed for obtaining substantially round shaped profiles of holes made in large-size workpieces and in difficulty accessible locations of workpieces.

The workpiece 7 is preferably rotated relative to the electrode tool for drilling holes in small-size workpieces.

In order to increase the efficiency of the electroerosive machining process, it is also possible to rotate both the workpiece 7 and the central electrode 1 of the electrode tool independently in the opposite directions.

What is claimed is:

1. A tool electrode for electrical discharge piercing of workpieces, comprising a shell having a working end; a one piece central electrode made of metal arranged inside said shell, said central electrode being mounted in a spaced relation to said shell and having a protruding portion which protrudes beyond said working end of said shell in the direction toward said workpiece, said protruding portion of said central electrode being bent at a fixed angle $\alpha$, the end of said bent portion protruding beyond the limits of the periphery of said shell.

2. A tool electrode according to claim 1, wherein said shell is made of metal, and an electrically insulating coating is applied thereto at a distance from said working end of said shell.

3. A tool electrode according to claim 1, wherein said shell is made of a dielectric material.

4. An electrode tool according to claim 1, in which said shell is fabricated from metal.

5. In a method for electrical discharge piercing of workpieces with a tool electrode having a one piece central electrode with a protruding portion bent at a fixed angle $\alpha$, comprising the steps of feeding at least one of the group of the workpiece and the tool electrode, said tool electrode penetrating said workpiece to a predetermined depth; deviating said at least one of the group of the workpiece and the tool electrode during feeding by at least one combined movement in a direction substantially perpendicular to said feed direction; penetrating said electrode tool to a certain depth in said workpiece being machined; and moving said at least one of the group of the workpiece and the tool electrode in a direction opposite to said feed direction at a rate allowing an undercut (reverse angle) configuration to be imparted during piercing, the hole being pierced in one pass.

6. A method according to claim 5, wherein at least one of the group of the workpiece and the central electrode are rotated.

7. A method according to claim 5, wherein said central electrode of said tool electrode and said workpiece are rotated independently of each other in opposite directions.

* * * * *